G. B. PHILLIPS.
BAND SAWING-MACHINE.
No. 185,045. Patented Dec. 5, 1876.
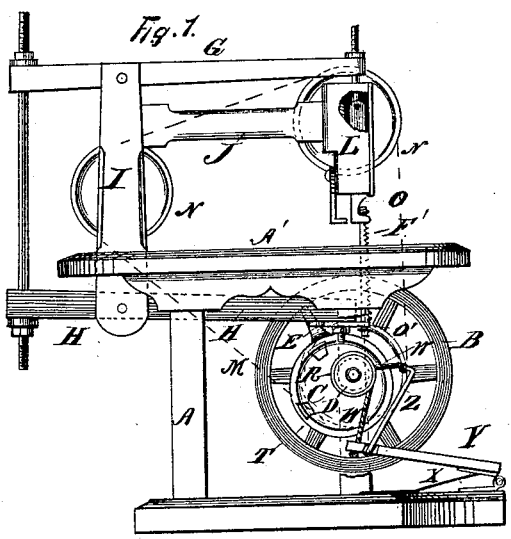
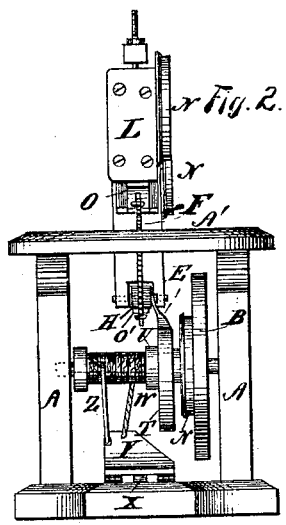
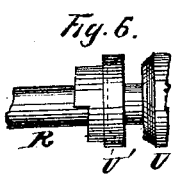
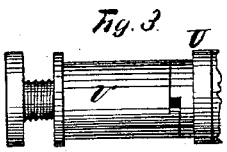
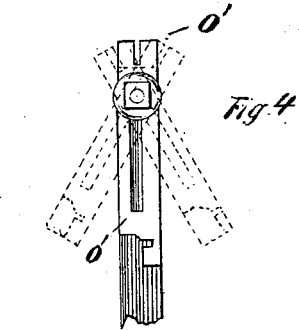
WITNESSES.
Fred G. Dieterich
B. S. Krall
INVENTOR
George B. Phillips.
By Daniel Breed.
THE GRAPHIC CO.N.Y.

UNITED STATES PATENT OFFICE.

GEORGE B. PHILLIPS, OF BATH-ON-THE-HUDSON, NEW YORK, ASSIGNOR TO GEORGE A. PHILLIPS AND CALEB W. PALMER.

IMPROVEMENT IN BAND SAWING-MACHINES.

Specification forming part of Letters Patent No. 185,045, dated December 5, 1876; application filed November 20, 1876.

*To all whom it may concern:*

Be it known that I, GEORGE B. PHILLIPS, of Bath-on-the-Hudson, in the county of Rensselaer and State of New York, have invented certain new and useful Improvements in Band Sawing-Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

In the accompanying drawings, Figure 1 is a side view of improved gig and band saw and foot power or treadle. Fig. 2 is a front view of the same. Figs. 3, 4, and 6 are detached views.

My invention consists in certain improvements in gig-saws, which will be fully understood by the following description.

The frame A and table A' may be of any suitable construction. The balance-wheel B and eccentric C are arranged upon the axle or spindle D for operating the pitman E, and thus giving a reciprocating motion to the saw F, which is carried by the two pivoted levers G and H. The standard I has a fixed arm, J, which supports the guide L, in which the plunger O works. Thus, by giving this plunger a quarter revolution, and also turning the plate O' which holds the lower end of the saw, the saw F may be turned crosswise of the table A', for the purpose of sawing very wide boards; also, I can saw any desired length of stuff.

This saw F may be entirely removed, and a band-saw, F, Fig. 1, substituted. This band-saw is carried by the three flanged wheels N, the lower one of which is attached to the balance-wheel B, thus giving motion to the saw.

The two upper wheels N are set wide apart, so as to give a wide space between the two parts of the saw above the table A'.

My improved foot-power is very important. The shaft or axle D runs loosely in a sleeve, R, to which are fixed the balance-wheel B and the eccentric C; so that these three parts all turn as one piece, thus moving the yoke T and pitman E, as above mentioned.

Upon the sleeve R I place a friction-clutch, U, provided with a bevel-bearing, U', by means of which motion is communicated to the eccentric C in the following manner: The spool V turns loosely on the sleeve R, and is provided with a cord, W, wound several times around the spool. One end of this cord is fastened to the treadle Y, and the other end is fastened to the bow Z, so that by moving the treadle by the foot, in the usual manner, this spool is rapidly rotated, first forward and then backward. The treadle has a spring, X, to raise the same when the pressure of the foot is relieved.

Now, as the treadle is pressed down, the tendency of the cord is to draw the spool against the clutch U, and the clutch, in turn, against the bevel friction-bearing U'. At the same moment the spool and clutch are locked together by means of the catch V', Fig. 3, and thus held until the stroke is completed; but when the motion of the treadle is reversed, and the tension of the cord slackened, (or its action reversed), the friction-clutch and the spool are both released. Then the balance-wheel and eccentric both move on while the spool turns backward upon the sleeve to take a new stroke.

By using a small spool and long cord, and also a long bow, Z, I secure a large number of turns of the spool at one stroke of the treadle, and with a large saw I can get ten turns of the spool to one tread, and thus drive the saw very fast.

Having described my invention, I claim—

1. The eccentric C, its driving mechanism and pitman E, in combination with the levers G and H, for operating the saw F, substantially as set forth.

2. The balance-wheel B, eccentric C, and sleeve R, in combination with the axle or spindle D, substantially in the manner and for the purposes set forth.

3. The spool V and friction-clutch U, in combination with the eccentric C, arranged and operated as set forth.

In testimony that I claim the foregoing as my own I affix my signature in presence of two witnesses.

GEORGE B. PHILLIPS.

Witnesses:
GEORGE A. PHILLIPS,
LUKE SLADE.